United States Patent [19]
Tayloe et al.

[11] Patent Number: 5,703,595
[45] Date of Patent: Dec. 30, 1997

[54] METHOD AND APPARATUS FOR ERRATIC DOPPLER FREQUENCY SHIFT COMPENSATION

[75] Inventors: Daniel Richard Tayloe, Phoenix; Nathan West Miller, Tempe; Robert Thomas Frederick, Chandler, all of Ariz.

[73] Assignee: Motorola, Inc., Schaumburg, Ill.

[21] Appl. No.: 691,256

[22] Filed: Aug. 2, 1996

[51] Int. Cl.$^6$ .................... G01S 13/00; H04B 1/10
[52] U.S. Cl. .................... 342/175; 455/63; 455/71
[58] Field of Search .................... 342/175; 455/54.1, 455/63, 69, 71

[56]  References Cited

U.S. PATENT DOCUMENTS

| | | | |
|---|---|---|---|
| 3,715,663 | 2/1973 | Laughlin et la. | 325/4 |
| 3,940,695 | 2/1976 | Sickles, II | 325/63 |
| 5,095,538 | 3/1992 | Dorboraw, III | 455/71 |
| 5,455,964 | 10/1995 | Roos et al. | 455/34.2 |

*Primary Examiner*—Mark Hellner
*Attorney, Agent, or Firm*—Kevin K. Johanson

[57]  ABSTRACT

A communication system includes base communication units (105, 155) facilitating a communication link with portable communication units (110) in motion relative to base communication units. The relative motion between base communication units (105, 155) and portable communication units (110) introduces Doppler frequencies into communication links (115, 165). When portable communication units (110) travel in a predictable direction (119), frequency offsets for Doppler compensation are generally predictable. However, when portable communication units (110) move erratically in relationship to a base communication unit (105, 155), frequency offsets for Doppler compensation are not easily calculated. Incorporation of velocity vector data into the frequency offset calculation for Doppler compensation provides reliable tracking and Doppler frequency compensation for erratic motion of portable communication units (110).

24 Claims, 2 Drawing Sheets

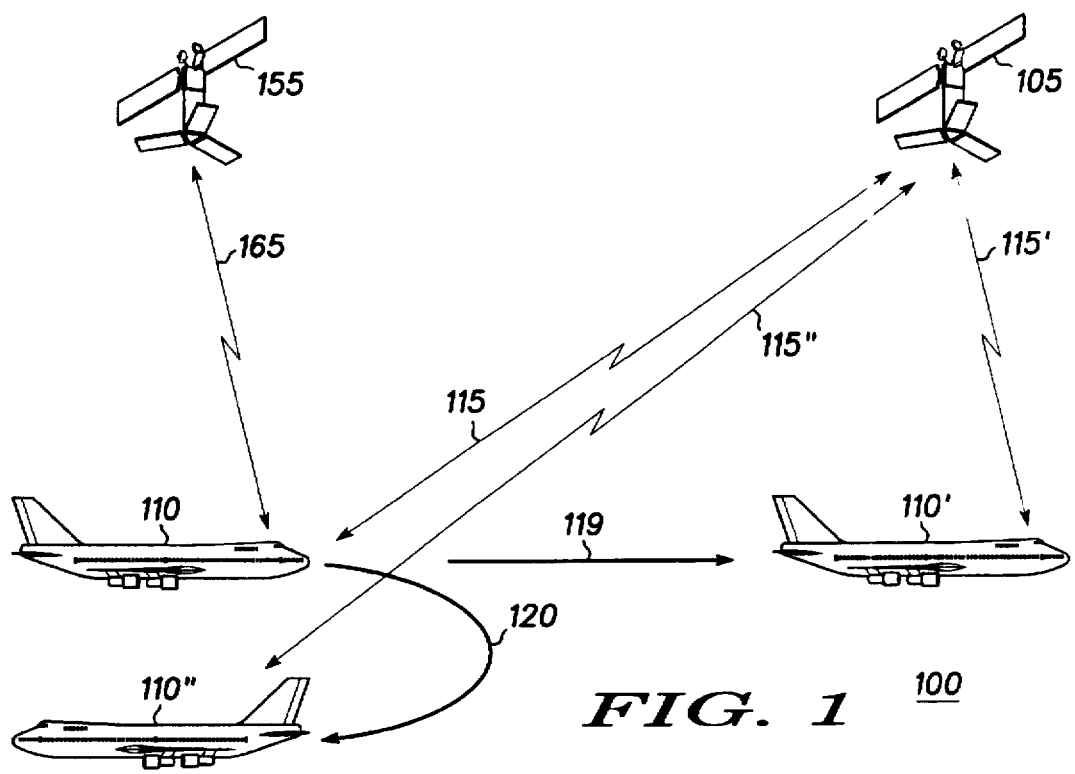
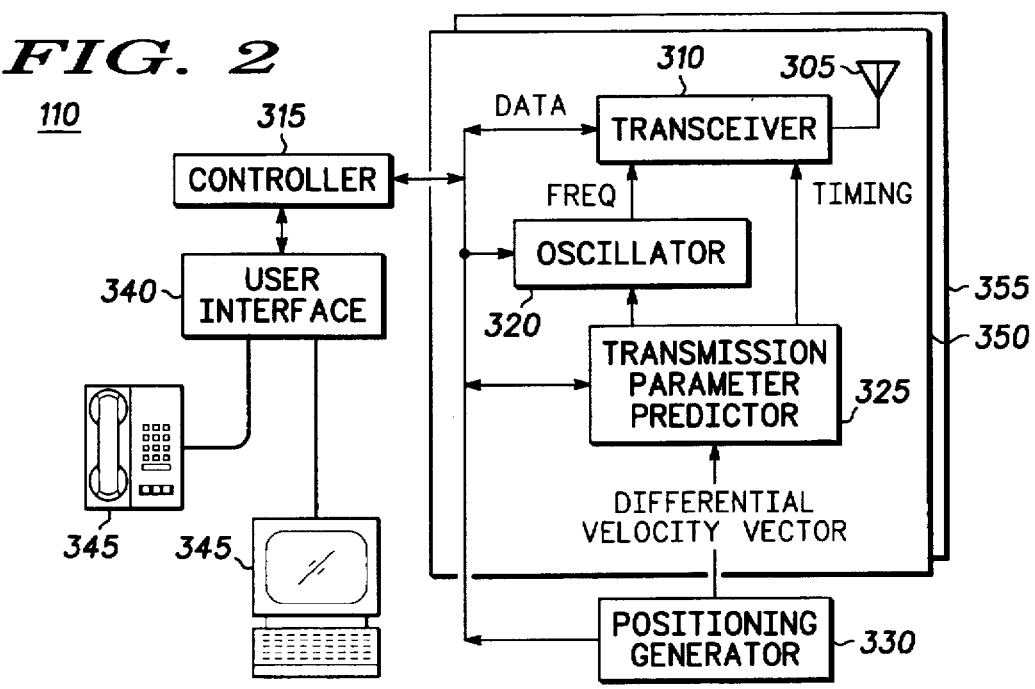

METHOD AND APPARATUS FOR ERRATIC DOPPLER FREQUENCY SHIFT COMPENSATION

FIELD OF THE INVENTION

The present invention relates generally to the field of radio communications and, more particularly, to the field of frequency compensation of communication links influenced by Doppler frequency effects.

BACKGROUND OF THE INVENTION

Typical communication systems are allocated a spectrum or frequency band wherein they may operate. Efficient communication systems partition this spectrum into smaller units known as channels. Each of these channels are then individually allocated and employed in the establishment of a communication channel between a transmitter and a receiver.

When one or more transmitters or receivers are in motion relative to the other, a well known effect occurs known as a Doppler effect. Doppler effects influence the actual transmission and receiving frequencies of both transmitter and receiver. The presence of a Doppler frequency increases or decreases the actual frequency employed over the communication channel. Such a shift of a communication channel frequency may cause the employed communication channel to exceed its allocated channel or frequency boundary potentially causing interference to adjacently assigned communication channels. In addition, if the frequency shift is large enough, the communications link between the transmitter and the receiver may be disrupted or even lost.

Conventional communication systems have adapted to the presence of Doppler frequency shifts by monitoring received signals and comparing them with the desired or assigned transmission channel. Transmitters then adjust their transmit frequency to account for the Doppler effect. Receivers also adjust their frequency to isolate the signal transmitted to them.

Prior systems have employed predictive mechanisms to anticipate and predict a frequency offset necessary to mitigate the Doppler effect on successive transmissions over a communication link. Additionally, other systems have employed iterative feedback mechanisms over the communication link such as the transmission of a feedback error value relating to the Doppler effect on the transmitted frequency. Such predictive mechanisms are sufficient when transmitters or receivers move with small variations in their velocity vectors or when the velocity vector of one or both ends is small enough in magnitude to introduce negligible Doppler frequency shift errors. Such gradual motion accommodates predictive frequency offsets for use in communication links. These predictive mechanisms are used to aid the frequency compensating end of the communications link in "coasting" through fading of the radio signal. The "coasting" allows the unit to predict the radio frequency changes when fading conditions do not allow direct observation of the radio signal.

However, when transmitters or receivers move in erratic or unpredictable directions at sufficiently high speeds to cause significant Doppler frequency shifts, known predictive mechanisms become ineffective, especially during periods of fading when there is no direct observation of the radio signal to correct against. When transmitters or receivers are, for example, airborne on conventional aircraft, a sudden 180° turn of the aircraft may cause as much as a three kilohertz change in the Doppler frequency at a communication frequency of 1800 Mhz. If such a maneuver was performed during a radio signal fade where no radio signal exist to track against, known predictive mechanisms will be 3 KHz in error, having no knowledge of the additional Doppler frequency changes induced by such a heading change. On the other hand, if such a maneuver where performed just prior to a fade, the errant maneuver may confuse the frequency predictive algorithm so as to cause the "coasting" algorithm to wrongly predict future frequency corrections that will be needed on the other side of the current fade.

When successive transmissions of a transmitter undergoing a high speed erratic change in its velocity vector occur, interference with adjacent assigned channels may occur or the radio link can shift far enough and rapidly enough in frequency that the communications link between the transmitter and receiver may become broken.

Thus, what is needed is a method and system for tracking and compensating erratic Doppler frequency shift in a communication link employing a frequency offset for Doppler compensation that will operate in a faded radio signal environment.

Thus, what is also needed is a portable communication unit for tracking and compensating erratic Doppler frequency shifts in a communication link employing a frequency offset for Doppler compensation.

What is yet needed is a method for tracking and compensating erratic Doppler frequency shift in communication links employing a frequency offset wherein a plurality of collocated portable communication units are in common motion and therefore exhibit a common dynamic velocity vector and a common Doppler frequency shift.

BRIEF DESCRIPTION OF THE DRAWINGS

A more complete understanding of the present invention may be derived by referring to the detailed description in claims when considered in connection with the Figures, wherein like reference numbers refer to similar numbers through the Figures and:

FIG. 1 shows a block diagram of a communications system within which the present invention may be practiced;

FIG. 2 shows a block diagram of a portable communication unit in accordance with a preferred embodiment of the present invention.

Figure 3:
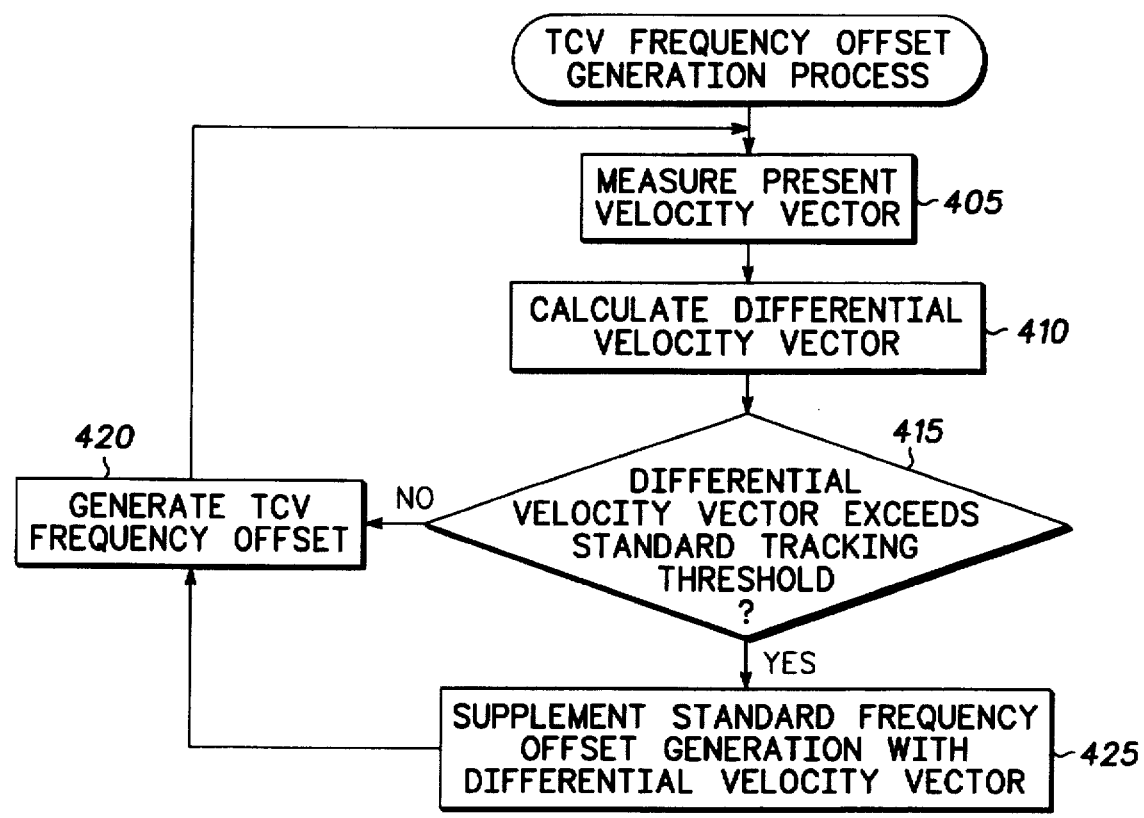
FIG. 3 shows a flow chart of a transceiver frequency offset generation process for compensating erratic Doppler frequency shift in a communication link in accordance with a preferred embodiment of the present invention.

The exemplification set out herein illustrates a preferred embodiment of the invention in one form thereof, and such exemplification is not intended to be construed as limiting in any manner.

DETAILED DESCRIPTION OF THE DRAWING

The present invention provides among other things, a method and system for tracking and compensating erratic Doppler frequency shifts in a communication link employing a frequency offset for Doppler compensation. The erratic Doppler frequency shifts arise from the dynamic or erratic motion or change in velocity vector associated with the motion of a fast moving platform, such as an airplane, or a high speed train, wherein a portable communication unit is engaged in a communication link. The system and method include measuring a present velocity vector of a portable communication unit, calculating the differential velocity vector between a presently measured velocity vector and a previously measured vector, and supplementing the standard frequency offset generation with the differential velocity vector, and generating a frequency offset using the differential velocity vector in conjunction with the standard frequency offset generation.

In alternative embodiment, the standard frequency offset need only be adjusted when either the differential velocity vector or the computed Doppler frequency shift exceeds a standard velocity or frequency tracking threshold.

In a preferred embodiment of the present invention, velocity vectors are generated by employing the services of and interpreting the data from a global positioning system. Such a positioning system provides accurate location data for the determination of the present location of the portable communication unit relative to a previous location of the portable communication unit. The present invention further provides a method and system for accommodating collocated portable communication units that are in motion having a shared dynamic velocity vector but employing separate communication channels having common varying Doppler effects. The generated frequency offset is then distributed to each portable communication unit exhibiting a common Doppler frequency shift.

FIG. 1 shows a block diagram of a communications system within which the present invention may be practiced. A communication system 100 is comprised of multiple and independent transmitters and receivers, herein after known as communication units or transceivers, capable of communications through communication links, that are preferably full duplex links, with other communication units. Referring to FIG. 1, communication system 100 has communication units on both airplanes and satellites.

In a communications system composed of satellites and airplanes such as commercial aircraft, the normal situation is for both to be moving in a constant direction, at a constant speed. In such a case, the normal Doppler frequency shift on communications channels between the two follow mathematically well defined frequency shifts which can be tracked by predictive filters (to handle fading cases) into which these well defined frequency shift curves have been programmed. Erratic motion on the part of the aircraft such as a turn or bank causes deviations from these well defined frequency curves that normal predictive tracking algorithms are not prepared to deal with.

Communication system 100 may also be comprised of communication units fixed in a terrestrial application such as mobile base communication units or high speed vehicular portable communication units such as "bullet" trains. Base communication units 105 and 155 provide communication services to other elements of communication system 100. Base communication units 105 and 155 facilitate a communication link 115 and communication link 165. Fascilitization of communication links 115 and 165 may require cooperative establishment and negotiation of communication parameters beyond the scope the present invention.

A portable communication unit 110 exhibits mobility in communication system 100. Portable communication unit 110 hereinafter PCU 110 may be fixed to a number of mobile platforms such as aircraft or other high speed vehicles capable of erratic or unpredictable directional change.

When PCU 110 moves in a predictable direction 119, standard frequency offset generation for communication link 115 suffices in compensating for Doppler effects and preserving communication link 115' when PCU 110 has moved in a constant direction as illustrated by PCU 110'. However, when PCU 110 moves in an erratic direction 120 (e.g., a 180 degree turn), standard frequency offset generation techniques such as those typically required to coast through radio channel fading periods can be insufficient at preserving communication link 115.

While some communication systems may employ adaptive frequency correction tracking mechanisms the may react fast enough to solve erratic maneuvering problems, if erratic changes in velocity vectors occur before a fade in the communication link, a predictive filter will integrate samples taken during the erratic motion change and the filter will track incorrectly during the next fade. The incorrect samples need to be replaced by recomputed samples consistent with the new velocity vector so that proper tracking may proceed and perform correctly during a subsequent fade of the communication link.

To preserve communication link 115" with PCU 110", additional processing is required. The present invention employs location information of the velocity vector of PCU 110 in comparison with a velocity vector of PCU 110". By augmenting or supplementing standard frequency offset generation with an additional Doppler frequency shift due to the a differential velocity vector as calculated between PCU 110 and PCU 110", the communication link 115" may be preserved.

It should be noted, nothing prevents base communication units 105 and 155 from being in motion relative to PCU 110. Additionally a plurality of PCU 110's may be collocated on a mobile platform sharing a common dynamic velocity vector. Furthermore a portion of the plurality of PCU 110's may have communication links to a separate base communication unit as depicted by base communication unit 155 and communication link 165.

FIG. 2 shows a block diagram of a portable communication unit in accordance with a preferred embodiment of the present invention. PCU 110 may take on many forms and in one embodiment, PCU 110 may be a self-contained portable communication handset or in another embodiment, may be a communication part or slice of a higher integrated assembly. PCU 110 may be in motion and may exhibit dynamic variations in velocity vectors associated with relative motion of PCU 110. When the relative motion of PCU 110 becomes erratic or unpredictable, standard frequency offset generation may be inadequate for the corresponding Doppler frequency shifts present at PCU 110. However, by accounting for the additional Doppler frequency shifts caused by erratic motion of PCU 110, PCU 110 tracks and compensates for the erratic frequency shifts, even when used in a fading radio signal environment.

When operational, PCU 110 supports a communication link through an antenna 305 and a transceiver 310. Transceiver 310 communicates over a communication link while employing a frequency offset for mitigation of Doppler frequency effects. Transceiver 310 may employ general communication technology such as time domain or frequency domain multiplexing of assigned communication channels. Furthermore transceiver 310 may be programmable from a controller 315 coupled to transceiver 310. In the preferred embodiment transceiver 310 employs time and frequency domain multiplexing of communication signals, thus requiring stringent frequency and timing controls of transmitted and received data. An oscillator 320 couples to transceiver 310 and controller 315 provides a reference signal to transceiver 310 for modulation and demodulation purposes.

A positioning generator 330 measures velocity vectors associated with PCU 110. Velocity vectors, designating direction and magnitude, are iteratively sampled by positioning generator 330 to determine erratic variations in the orientation of PCU 110. Positioning generator 330 measures a present velocity vector and presents the present velocity vector to controller 315 for comparison with a previously sampled velocity vector. Positioning generator 330 in the preferred embodiment employs a global positioning system for generation of the velocity vector. Global positioning systems are known by those of skill in the art and are not discussed herein.

A transmission parameter predictor 325 coupled to Controller 315 and positioning generator 330 tracks or generates frequency offsets used for Doppler frequency compensation. Transmission parameter predictor 325 may be comprised of a Kalman filter for tracking slightly varying parameters such as a gradual change in Doppler frequency. However, traditional Kalman filters are unresponsive to erratic changes in parameters such as a change in the velocity vector affecting Doppler frequency, particularly when the velocity is at high speed. Since the filter naturally assumes uniform velocities on the part of both ends of the communication link, the erratic changes in a velocity vector, if not corrected for, will disrupt the future frequency predictions of the filter. Transmission parameter predictor 325 incorporates a differential velocity vector in its calculation of a frequency offset when the differential velocity vector exceeds a standard tracking threshold. A standard tracking threshold is that threshold wherein a Kalman filter or a like filter such as a coasting filter may continue to provide, through predictive techniques, future frequency offsets for Doppler compensation. These coasting filters are designed to predict future Doppler corrections for cases when the radio link experiences fading and assume that either end of the radio link do not undergo any significant velocity vector changes. Transmission parameter prediction may be implemented as a Kalman filter having a separate controller for receiving and adjusting the Kalman filter outputs in relationship to the received differential velocity vector received.

Transmission parameter predictor 325 enables PCU 110 to maintain a communication link during erratic velocity vector changes such as occur when an airframe or other mobile platform erratically or suddenly change their velocity vector.

A controller 315 couples to transceiver 310, transmission parameter 325, and positioning generator 330 and receives velocity vector data from positioning generate 330. Controller 315 calculates a differential velocity vector or, in an alternate embodiment, positioning generator 330 may calculate a differential velocity vector, for use in comparison with a standard velocity tracking threshold. In an alternate embodiment, controller 315 calculates the differential Doppler frequency shift for use in comparison with a standard frequency tracking threshold. Controller 315 also interfaces with transceiver 310 for providing and receiving transmission data. Controller 315 additionally interfaces to a user interface 340 for interfacing with transmitted data from user terminals 345. User terminals 345 may be voice, data, or other computer-like terminal devices for presenting and perceiving information. Furthermore, user interface 340 may accommodate a plurality of user terminals 345 by providing multiplexed or dedicated access to user terminals 345.

In an alternate embodiment, a mobile platform wherein portable communication units 110 are located may accommodate a plurality of portable communication units 110 or portions thereof. FIG. 2 depicts a first portion 350 of portable communication units 110. First portion 350 may be a plurality of PCU 110s receiving communication data from a particular base communication unit 105 as depicted in FIG. 1. A second portion 355 of portable communication units 110 may receive communication from a second or separate base communication unit 115 as shown in FIG. 1. These spatially diverse base communication units present differing Doppler frequencies that possess separate or independent frequency offsets for communications with base communication units 105 and 155. Where collocated PCU 110s receive transmissions from a common base communication unit, only one PCU 110 need calculate a frequency offset for use during erratic changes in velocity vectors as each has a common Doppler frequency offset. In such an embodiment, generation of a common frequency offset may be distributed to other PCU 110s having the same Doppler frequency offset.

FIG. 3 shows a flow chart of a transceiver frequency offset generation process for compensating erratic Doppler frequency shift in a communication link in accordance with a preferred embodiment of the present invention.

A task 405 measures a present velocity vector as exhibited by the present state of PCU 110. As noted above, a velocity vector may be calculated, as in the preferred embodiment, using a global positioning system for derivation of location data. Derivation of a location or coordinates may then be used with other coordinates or other methods for determining a velocity vector of PCU 110.

In an alternate embodiment, a present velocity vector may be calculated by employing standard aircraft avionics. Standard aircraft avionics may include gyros and other electronics for determining a direction and velocity of PCU 110. The use of standard aircraft avionics for the generation of velocity vectors are known by those of skill in the art.

A task 410 calculates a differential velocity vector using a previously measured present velocity vector for comparison with a previous velocity vector which has been stored or retrieved from a previously iterated measurement of a velocity vector.

A query test 415 determines if the calculated differential velocity vector exceeds a standard tracking threshold. When a standard tracking threshold has not been exceeded, a task 420 generates a transceiver frequency offset using standard frequency tracking generation techniques. Generation of a transceiver frequency offset when a standard tracking threshold has not been exceeded may be accomplished, in the preferred embodiment, by employing a Kalman filter for standard frequency offset generation. Other techniques are known by those of skill in the art for generation or tracking by employing coasting algorithms for prediction of minor deviations in parameters.

In an alternate embodiment of the present invention communication links between base communication unit 105 and PCU 110 may contain status information employing iterative feedback parameters informing PCU 110 of error values in selected frequency offsets and timing offsets. Such iterative feedback may then be adjusted by incrementally advancing or receding a selected frequency offset. However, when a differential velocity vector exceeds a standard tracking threshold, iterative feedback compensating techniques are by themselves inadequate for tracking erratic velocity vector changes in PCU 110 since the standard tracking algorithms assume each end has a uniform velocity.

In the preferred embodiment, the standard tracking threshold is a velocity change threshold. When the differential velocity vector exceeds the standard tracking threshold, as in the case when PCU 110 has erratically changed its velocity vector, a task 425 supplements the standard frequency offset generation with the differential velocity vector. Supplementation of standard frequency offset generation with differential velocity vector information allows PCU 110 to maintain a communication link during erratic velocity vector changes.

In an alternate embodiment, the standard tracking threshold is a Doppler frequency shift threshold. Once the differential velocity vector is determined, the resulting Doppler frequency shift can be determined and the magnitude of the frequency shift compared against a standard frequency tracking threshold wherein standard tracking compensation mechanisms are sufficient. When the Doppler frequency shift exceeds the standard frequency tracking threshold, standard frequency offset generation is supplemented by the Doppler frequency shift calculated from the differential velocity vector information.

In yet another alternate embodiment, the standard tracking threshold is an acceleration threshold. The magnitude of the acceleration can be compared against a standard acceleration tracking threshold wherein standard tracking compensation mechanisms are sufficient. When the magnitude of the acceleration vector exceeds the standard acceleration tracking threshold, standard frequency offset generation is supplemented by the Doppler frequency shift calculated from either the differential velocity vector or acceleration vector information.

In yet another alternate embodiment, once the differential velocity vector is determined in task 410, the resulting Doppler frequency shift can be determined and the standard frequency offset generation is supplemented by the Doppler frequency resulting from differential velocity vector information at all times. In this case, no threshold is applied in determining when to supplement the standard frequency generation algorithm.

In summary, the present invention provides an improved method and apparatus for tracking and compensating erratic Doppler frequency shifts in a communication link. The present invention implements erratic Doppler frequency compensation by measuring a present velocity vector and comparing the present velocity vector with a previous velocity vector to calculate a differential velocity vector between the two vectors.

Having determined a differential velocity vector, this vector itself may then be compared against a standard velocity tracking threshold wherein standard tracking compensation mechanisms are sufficient. When the differential velocity vector exceeds the standard tracking threshold, standard frequency offset generation is supplemented by the Doppler frequency shift calculated from the differential velocity vector information. A frequency offset for use in maintaining the communication link is then generated for use in transmitting and receiving. Communication links may then be sustained during erratic Doppler frequency shifting of a portable communication unit, even in an environment where the radio channel is experiencing fading.

The present invention has been described above with references to preferred embodiments. However, those skilled in the art will recognize that changes and modifications may be made in these preferred embodiments without departing from the scope of the present invention. For example, those skilled in the art will appreciate that the precise processes, tasks and task sequencing described herein, may be considerably varied while achieving equivalent functions. These and other changes and modifications which are obvious to those skilled in the art are intended to be included within the scope of the present invention.

What is claimed is:

1. In a communication system having a portable communication unit in motion with a dynamic velocity vector, a method for tracking and compensating erratic Doppler frequency shift in a communication link employing a frequency offset for Doppler compensation, said method comprising the steps of:

measuring a present velocity vector of said portable communication unit;

calculating a differential velocity vector between said present velocity vector and a previous velocity vector, said previous velocity vector being an earlier iterative stored sample of a velocity vector;

supplementing standard frequency offset generation with said differential velocity vector, said standard frequency offset generation providing adequate tracking of non-erratic Doppler frequency shift; and generating said frequency offset using said standard frequency offset generation and said differential velocity vector.

2. The method as recited in claim 1, wherein said supplementing step comprises the steps of:

when said differential velocity vector exceeds a standard tracking threshold, supplementing standard frequency offset generation with said differential velocity vector, said standard frequency offset generation providing adequate tracking of non-erratic Doppler frequency shift.

3. The method as recited in claim 2, wherein said standard tracking threshold is a velocity change threshold.

4. The method as recited in claim 2, wherein said standard tracking threshold is a Doppler frequency shift threshold.

5. The method as recited in claim 2, wherein said standard tracking threshold is an acceleration threshold.

6. The method as recited in claim 1, wherein said measuring step comprises the step of:

employing a global positioning system for generation of said present velocity vector.

7. The method as recited in claim 1, wherein said measuring step comprises the step of:

employing conventional aircraft avionics for generation of said present velocity vector.

8. The method as recited in claim 1, wherein said supplementing step further comprises the step of:

employing Kalman filtering for said standard frequency offset generation.

9. The method as recited in claim 1, wherein said supplementing step further comprises the step of:

employing iterative transmission feedback denoting frequency offset errors of said Doppler compensation from said standard frequency offset generation.

10. In a communication system having a plurality of collocated portable communication units in motion and having a dynamic velocity vector, a method for tracking and compensating Doppler frequency shift in a communication link employing a frequency offset for Doppler compensation, said method comprising the steps of:

measuring a present velocity vector of said plurality of collocated portable communication units;

calculating a differential velocity vector between said present velocity vector and a previous velocity vector, said previous velocity vector being an earlier iterative stored sample of a velocity vector;

when said differential velocity vector exceeds a standard tracking threshold, supplementing standard frequency offset generation with said differential velocity vector, said standard frequency offset generation providing adequate tracking Of non-erratic Doppler frequency shift; and generating said frequency offset using said standard frequency offset generation and said differential velocity vector.

11. The method as recited in claim 10, further comprising the steps of:

partitioning said plurality of collocated portable communication units into a first portion having a first Doppler frequency shift and a second portion having a second Doppler frequency shift; and generating a first frequency offset using said standard frequency offset generation and said differential velocity vector for use by said first portion of said plurality of collocated portable communication units, and a second frequency offset using said standard frequency offset generation and said differential velocity vector for use by said second portion of said plurality of collocated portable communication units.

12. The method as recited in claim 11, wherein said measuring step comprises the step of:

employing a global positioning system for generation of said present velocity vector.

13. The method as recited in claim 11, wherein said measuring step comprises the step of:

employing conventional aircraft avionics for generation of said present velocity vector.

14. The method as recited in claim 11, wherein said supplementing step further comprises the step of:

employing Kalman filtering for said standard frequency offset generation.

15. The method as recited in claim 11, wherein said supplementing step further comprises the step of:

employing iterative transmission feedback denoting frequency offset errors of said Doppler compensation from said standard frequency offset generation.

16. A communication system for tracking and compensating erratic Doppler frequency shift in a communication link employing a frequency offset for Doppler compensation during dynamic variations in velocity vectors in said communication system, comprising:

a base communication unit for cooperatively establishing and communicating over said communication link; and a portable communication unit in motion for measuring a present velocity vector, calculating a differential velocity vector between said present velocity vector and a previous velocity vector, when said differential velocity vector exceeds a standard tracking threshold, supplementing standard frequency offset generation with said differential velocity vector, said standard frequency offset generation providing adequate tracking of non-erratic Doppler frequency shift, and generating said frequency offset using said standard frequency offset generation and said differential velocity vector.

17. The communication system as recited in claim 16, wherein said portable communication unit further comprises:

a positioning generator for measuring said present velocity vector of said portable communication system by employing a global positioning system for generation of said present velocity vector.

18. The communication system as recited in claim 16, wherein said portable communication unit further comprises:

a positioning generator for measuring said present velocity vector of said portable communication system by employing conventional aircraft avionics for generation of said present velocity vector.

19. The communication system as recited in claim 16, wherein said portable communication unit further comprises:

a Kalman filter for generating said frequency offset when said differential velocity vector exceeds said standard tracking threshold by supplementing said standard frequency offset generation with said differential velocity vector.

20. The communication system as recited in claim 16, wherein said base communication unit further comprises:

a means for employing iterative transmission feedback to said portable communication unit using said communication link, said iterative transmission feedback denoting frequency offset errors of said Doppler compensation from said standard frequency offset generation.

21. A portable communication unit in motion and exhibiting dynamic variations in a present velocity vector exceeding standard frequency offset generation, said standard frequency offset generation providing adequate tracking of non-erratic Doppler frequency shift, said portable communication unit for tracking and compensating erratic Doppler frequency shift in a communication link employing a frequency offset for Doppler compensation, comprising:

a transceiver for communicating over said communication link using said frequency offset generated from a differential velocity vector;

a positioning generator for measuring a present velocity vector of said portable communication unit;

a controller coupled to said transceiver and coupled to said positioning generator for calculating said differential velocity vector between said present velocity vector and a previous velocity vector, said previous velocity vector being an earlier iterative stored sample of a velocity vector; and a transmission parameter predictor coupled to said controller for generating said frequency offset using said differential velocity vector.

22. The portable communication unit as recited in claim 21, wherein said positioning generator employs a global positioning system for generation of said velocity vector.

23. The portable communication unit as recited in claim 21, wherein said positioning generator employs conventional aircraft avionics for generation of said present velocity vector.

24. The portable communication unit as recited in claim 21, wherein said transmission parameter predictor further comprises a Kalman filter for generating said frequency offset.

* * * * *